United States Patent [19]

Carlin

[11] 3,890,244
[45] June 17, 1975

[54] RECOVERY OF TECHNETIUM FROM NUCLEAR FUEL WASTES

[75] Inventor: William W. Carlin, Portland, Tex.

[73] Assignee: PPG Industries, Inc., Pittsburgh, Pa.

[22] Filed: Nov. 24, 1972

[21] Appl. No.: 309,048

[52] U.S. Cl. ....... 252/301.1 R; 204/105 R; 204/109; 252/301.1 W; 423/2; 423/22; 423/49; 423/50
[51] Int. Cl. .............................................. C02c 5/14
[58] Field of Search ............ 252/301.1 W, 301.1 R; 423/2, 22, 49, 50; 204/105, 109; 75/121

[56] References Cited
UNITED STATES PATENTS

| | | | |
|---|---|---|---|
| 2,895,880 | 7/1959 | Schumpelt | 204/47 |
| 3,309,292 | 3/1967 | Andrews et al. | 204/39 |
| 3,374,157 | 3/1968 | Box | 204/45 R |
| 3,672,875 | 6/1972 | MacCragh | 252/301.1 R |
| 3,708,508 | 1/1973 | Schultz | 423/22 X |

OTHER PUBLICATIONS

Korkisch, Modern Methods for the Separation of Rarer Metal Ions, 1969, Pergamon Press, pp. 512-513, 520, 522, 552.

Lingane, Electroanalytical Chemistry, 2nd ed. 1958, Interscience Publishers, Inc., pp. 416-420.

Primary Examiner—Benjamin R. Padgett
Assistant Examiner—R. E. Schafer
Attorney, Agent, or Firm—Irwin M. Stein

[57] ABSTRACT

Technetium is removed from aqueous, acidic waste solutions thereof. The acidic waste solution is mixed with a flocculant, e.g., an alkaline earth metal hydroxide or oxide, to precipitate certain fission products, e.g., palladium, rhodium and ruthenium, contained in the acidic waste solution. Technetium remains in solution and in the resulting supernatant alkaline aqueous phase. The supernatant alkaline aqueous phase is made acidic and electrolyzed in an electrolytic cell under controlled cathodic potential conditions to deposit technetium on the cathode. Elemental technetium is removed from the cathode. Technetium is separated from other plated fission product metals by extraction from an alkaline solution with an organic extractant, such as pyridine, having affinity for technetium. Technetium is separated from the organic extractant by steam distillation and the resulting aqueous phase treated with ammoniacal reagent to precipitate technetium as ammonium pertechnetate.

The precipitate from the flocculation step is removed to an interim storage vessel from whence it can be returned to the nuclear fuel processor for disposal. In a further embodiment, the precipitate is acidified to form an aqueous acidic solution of fission product metal values and the solution electrolyzed in an electrolytic cell under controlled cathodic potential conditions and at a potential sufficiently negative to plate out from the solution those fission product metals desired. The metal deposit is stripped from the cathode and stored until its radioactivity has diminished. The metal depleted cell liquor is returned to the nuclear fuel processor.

16 Claims, 1 Drawing Figure

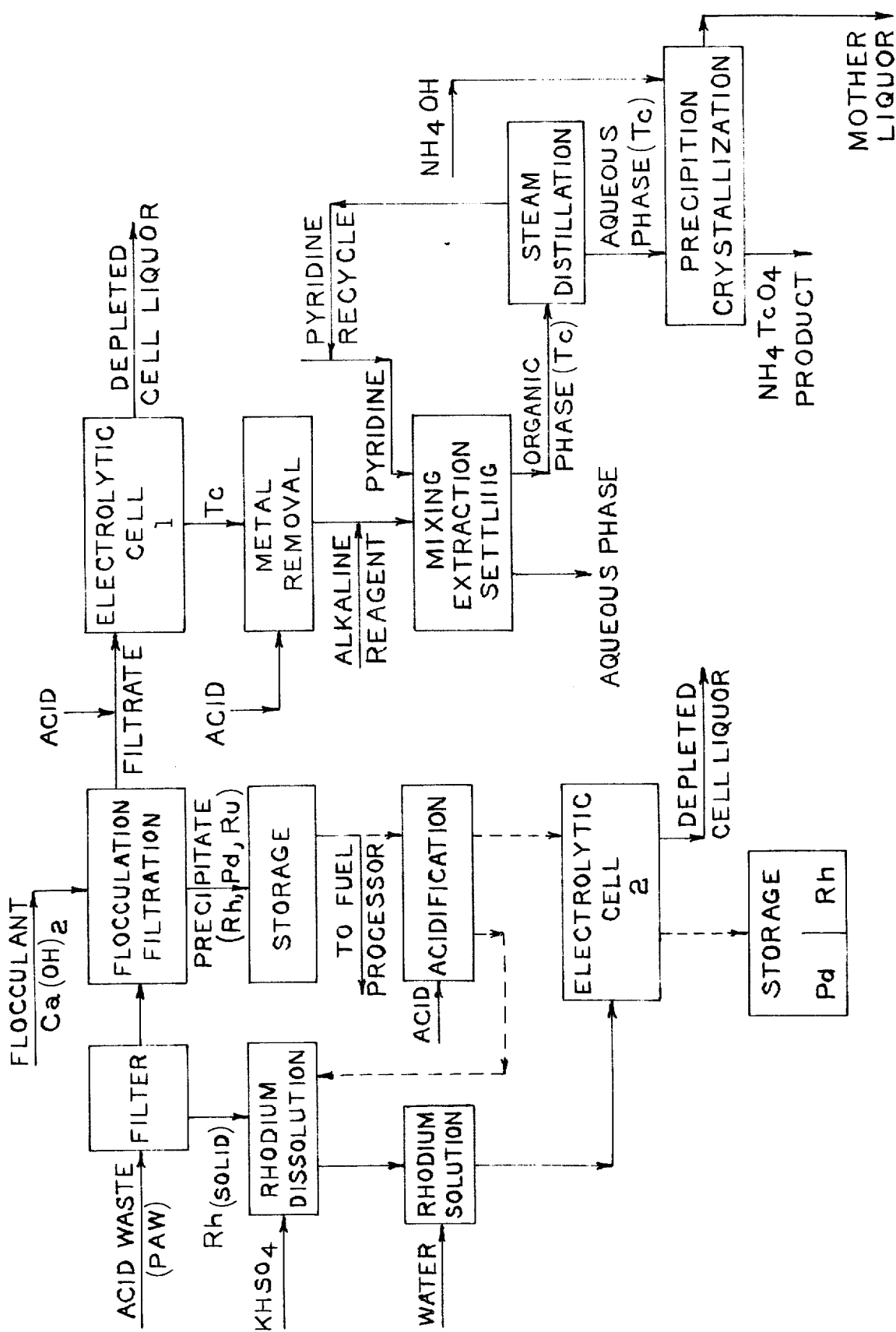

3,890,244

RECOVERY OF TECHNETIUM FROM NUCLEAR FUEL WASTES

DESCRIPTION OF THE INVENTION

The present invention relates to the treatment of aqueous solutions containing fission products, e.g., palladium, rhodium, technetium and ruthenium, most notably, aqueous, acidic waste solutions containing fission products obtained in processing neutron-irradiated nuclear fuel elements. In the conventional operation of uranium-fueled nuclear reactors, it is necessary to process the reactor fuel elements periodically to decontaminate and purify them in order to sustain continued operation. In the fission reaction, an atom of fissionable uranium isotope, upon absorbing a neutron, splits, thereby forming at least two smaller atoms and emitting a plurality of neutrons. These neutrons pass through the fuel element where they can be absorbed by another atom of fissionable uranium isotope thereby inducing its fission and propagating the chain reaction. The smaller atoms resulting from the fission, together with their radioactive decay products, are termed "fission products." These fission products comprise isotopes having atomic numbers ranging predominantly from 30 to 63 and largely remain intimately dispersed and entrapped within the fuel element. Among such fission products are species that are highly neutron-absorptive and thus deleteriously serve to intercept and drain away neutrons produced during fission so as to attenate the further propagation of the chain reaction. Accordingly, a fuel element, upon attaining enough relative fission product concentration, is customarily discharged from the reactor and processed to eliminate fission product contamination and to isolate and recover the remaining bulk of the uranium.

One such recovery process is known as the Purex process which is fully described in U.S. Pat. No. 2,990,240, issued June 27, 1961 in the names of Charles N. Ellison and Thomas C. Runion and entitled PROCESS FOR SEGREGATING URANIUM FROM PLUTONIUM AND FISSION PRODUCT CONTAMINATION. In the Purex process, fuel elements from nuclear reactors are dissolved in nitric acid. The plutonium, uranium and neptunium therein are recovered by tri-n-butyl phosphate solvent extraction leaving the majority of fission products, including palladium, rhodium and technetium, in the acidic aqueous wastes, which are termed Purex acid wastes (PAW). The process produces approximately 800 liters of liquid radioactive waste material per metric ton of fuel processed. Heretofore, the Purex acid wastes have been neutralized with sodium carbonate and stored in large underground tanks designed to contain this self-boiling, highly radioactive solution. After 4 to 5 years of storage, the radioactivity of the solution diminishes to the point where the solution becomes non-boiling and the majority of fission products settle to the bottom of the tank in a layer of sludge.

The supernatant aqueous phase in the storage tank contains most of the cesium, strontium, rhodium, palladium, ruthenium and technetium in solution. Most of the highly radioactive cesium and strontium are selectively removed from the supernatant leaving, in solution, salts of rhodium, palladium, technetium, ruthenium, sodium and low levels of other fission products. This supernatant is customarily termed "aged alkaline Purex wastes" (PWS) and processes for separation and recovery of palladium, rhodium and technetium from such aqueous alkaline waste solutions have been proposed. See, for example, U.S. application for patent (TCS-71-55), Ser. No. 309,015, filed contemporaneously herewith, in the names of William W. Carlin and William Bruce Darlington and entitled RECOVERY OF FISSION PRODUCTS FROM WASTE SOLUTIONS THEREOF.

With the increasing number of nuclear fuel reactors being built and proposed for electric power generation, there is need for improved methods for processing radioactive liquid wastes. Announcements from the U.S. Atomic Energy Commission indicate that highly radioactive liquid wastes will be required to be processed for disposal within 5 years of their formation.

Although the aqueous waste streams produced by nuclear fuel processing contain palladium, rhodium and technetium only at a parts per million concentration, the total amount of the aforesaid metals present in such aqueous wastes is significant because of the large volume of aqueous waste produced. It has been estimated that by 1980 more rhodium per year will be made by the nuclear industry than will be consumed in the United States. Technetium is not found naturally in nature, but it is produced by the aforementioned fission process and has been produced by neutron irradiation of molybdenum. See, for example, U.S. Pat. No. 3,382,152. Rhodium and palladium are both rare in nature. Thus, the potential dollar value of the aforesaid metals in such aqueous waste streams is high.

In accordance with one embodiment of the present process, an aqueous, acidic waste stream containing fission product metal values is treated to remove technetium from it. In a further embodiment, rhodium and palladium are recovered also in a form suitable for storage until their radioactivity diminishes to a level at which they can be more easily handled. More specifically, the aforementioned aqueous, acidic waste stream (PAW), which generally has an acid concentration of about 8 molar and which is highly radioactive, is filtered to recover undissolved rhodium and the filtrate is treated with an alkaline earth flocculating reagent. Such treatment precipitates a substantial portion of the rhodium, palladium and ruthenium present in the aqueous waste stream as well as some of the other fission product metal values present therein. In this manner, technetium, which remains in the supernatant alkaline aqueous phase, is efficiently separated from a substantial portion of the other fission product metal values in the aqueous waste stream. Further, this treatment results in the production of a supernatant aqueous phase of significantly reduced radioactivity than that of the original waste stream.

The precipitate that is formed by treatment with the alkaline earh flocculating reagent, can be stored for processing at a future time when the radioactivity of the precipitate has diminished or it can be returned to the fuel processor for solidification and burial. In a further feature, if storage of the precipitate in a more condensed form is desired, the precipitate can be dissolved with acid and the resulting acidic solution electrolyzed in an electrolytic cell under controlled cathode potential conditions and at a potential sufficiently negative to deposit rhodium. Since palladium and ruthenium are deposited at a potential more positive than rhodium, they also will be deposited on the cathode. Other fission product metals will remain in solution. The depleted cell liquor is returned to the fuel processor while the metal deposit on the cathode is stripped and stored to await decontamination.

The supernatant aqueous alkaline phase containing the technetium is acidified, e.g., usually with mineral acid, and electrolyzed in an electrolytic cell under controlled cathodic potential conditions and at a potential sufficiently negative to deposit technetium on the cathode. The depleted cell liquor is returned to the fuel processor and elemental technetium recovered from the cathode by mechanically or chemically stripping the metal deposit from the cathode.

Technetium is further refined, i.e., separated from other fission product metals plated on the surface of the cathode, by treating an alkaline solution of the stripped metal deposit with an organic solvent having affinity for technetium, thereby extracting the technetium into the organic solvent phase and leaving residual fission product metal values in the aqueous phase. The aqueous phase is returned to the fuel processor. The organic phase is steam distilled to recover organic solvent for reuse and the resulting aqueous phase, which contains the technetium, is treated with ammoniacal reagent to recover the technetium as its salt, ammonium pertechnetate. The mother liquor from the precipitation step is returned to the fuel processor. Alternatively, the next preceding aqueous phase can be electrolyzed to recover elemental technetium.

BRIEF DESCRIPTION OF THE DRAWING

The present process may be more fully understood by reference to the accompanying drawing which is an abbreviated flow diagram of the recovery process of the present invention wherein technetium is recovered from reprocessed nuclear fuel acidic wastes and rhodium and palladium and some ruthenium recovered for storage.

DETAILED DESCRIPTION

Acidic waste solutions produced by commercial nuclear fuel processing plants contain significant quantities of technetium, palladium and rhodium. The acidic waste solution, depending, of course, upon the particular type of processing to which the fuel element is subjected, is typically a nitric acid solution resulting from dissolution of the nuclear fuel element with concentrated nitric acid. The acidity of such nitric acid solution can vary but is reported to be about 8 molar. The technetium, rhodium, and palladium content of such waste solutions will, of course, vary depending upon the processing used by the nuclear fuel processor as well as the particular type of nuclear fuel element processed and the period of irradiation to which the nuclear fuel element is exposed. It has been reported that a typical aqueous, acidic waste solution will contain approximately 15 grams per liter of ruthenium, 10 grams per liter of palladium, 3 grams per liter of rhodium and 5 grams per liter of technetium in an 8 molar nitric acid solution and that the total daily output of such metals will be about 8 pounds per metric ton of solid fuel processed. Such solutions are highly radioactive and contain, in addition to the aforementioned metals, the following more common isotopes: strontium$^{90}$, ruthenium$^{106}$, iodine$^{129}$, cesium$^{137}$, cerium$^{144}$, promethium$^{147}$, zirconium$^{95}$, niobium$^{95}$, yttrium$^{90}$, ruthenium$^{103}$, antimony$^{125}$, barium$^{137}$ and praseodymium$^{144}$ and cobalt$^{60}$.

In accordance with the present process and with reference to the accompanying drawing, highly acidic, processed nuclear fuel waste solution containing technetium, palladium, ruthenium and rhodium fission products is treated with an alkaline flocculating reagent. The amount of flocculating reagent mixed with the waste solution will vary with the particular volume and acidity of the solution treated; however, sufficient of the reagent is used to raise the pH of the solution to from about 9 to about 12. Preferably, the pH of the solution will be raised to from 9 to less than 12 and more preferably from 9 to 11.

While not wishing to be bound by any particular theory, from the experimental evidence at hand, it appears that many of the fission product metal values other than technetium start to form insoluble oxides and hydroxides at a pH of about 9. The formation of a precipitate of insoluble oxides and hydroxides continues and intensifies as the pH of the solution is raised. At a pH of about 12, some of the oxides and hydroxides can start to go back into solution. Therefore, in order to separate as much and as many of the radioactive and otherwise undesirable fission products, the pH of the acidic waste solution is adjusted to between 9 and 12. It has been surprisingly found that as a result of the aforesaid treatment, a substantial portion of the rhodium, palladium and ruthenium metal values in the acidic waste solution are removed from the waste solution as a precipitate while a substantial amount of the technetium remains in the supernatant alkaline aqueous phase. The reason for this phenomenon is not known for certain, but it is reasoned that rhodium, palladium and some ruthenium values probably as compounds thereof, are adsorbed by the flocculating reagent.

Suitable alkaline flocculating reagents are the alkaline earth metal oxides or hydroxides, e.g., calcium hydroxide, calcium oxide, magnesium hydroxide, magnesium oxide, barium oxide, barium hydroxide, strontium oxide and strontium hydroxide. The oxides and hydroxides of calcium and magnesium are preferred. The flocculating reagent can be added to the acidic waste stream in any suitable form, i.e., as a solid or slurry. Since it is desirable to minimize the amount of extra liquid moving throughout the system, it is preferred that the flocculating reagent be added in solid form.

Following adjustment of the pH of the acidic waste stream to the aforementioned alkaline range, the flocculant and precipitate thereby formed are permitted to settle in a suitable vessel or tank and the resulting precipitate separated from the supernatant by any conventional liquid-solid separating means, e.g., filtration or centrifugation. The alkaline filtrate, which contains technetium values, is made slightly acidic and electrolyzed in an electrolytic cell at a potential at which technetium is plated on the cathode and under controlled cathodic potential conditions. The acidity of the filtrate should be about 1 molar or less (acid concentration) for efficient electrolysis. Electrolysis of more acidic solutions, e.g., 8 molar solutions, results in the evolution of large quantities of hydrogen because the hydrogen discharge potential of highly acidic solutions is low. Further, technetium that is plated onto the surface of the cathode would be redissolved because of the highly acidic nature of the electrolyte. The acid concentration of the filtrate can range from about 0.25 molar to about 1 molar, more desirably from about 0.25 molar to about 0.5 molar, for electrolysis. Preferably, the filtrate acid concentration will be less than 0.25 molar but still sufficient to provide an acidic medium for electrolysis.

Typically, any conventional compatible mineral acid can be used to acidify the alkaline filtrate. Concentrated sulfuric or nitric acids are preferred since such acids are most compatible with the system and provide a suitable electrolysis medium. Concentrated acids, e.g., 8 to 15 molar, are preferred to reduce the volume of liquid handled in the recovery system.

After electrolysis of the acidified filtrate in electrolytic cell 1, cell liquor depleted of technetium is returned to the fuel processor for concentration and disposal. The technetium metal deposit on the cathode in electrolytic cell 1 is removed by any convenient conventional means. Mechanical removal by, for example, stripping the deposited metal with a knife-type edge, or chemical removal by dissolving the metal deposit in a strong acid compatible with the rest of the process are typically used. In the latter, the electrolytic cell is typically flooded with acid of sufficient strength to dissolve the technetium, or the cathode is removed from the cell and immersed in a bath of the aforementioned acid. Typically, nitric acid or sulfuric acid of at least 1 molar is used as the stripping acid. Preferably, concentrated acid, e.g., 8 to 15 molar is used. Since the following step requires an alkaline solution, it is preferred that the least amount of acid required to strip or dissolve the technetium deposit be used. Such a precaution minimizes the amount of alkaline reagent required to neutralize and make alkaline the acidic strip solution.

The technetium recovered from the cathode of electrolytic cell 1 will contain contaminating amounts of other fission product metals such as ruthenium, palladium, and rhodium. To separate further technetium from the other fission product metal values, the acidic strip solution is made alkaline and technetium extracted therefrom with an organic solvent by conventional liquid/liquid extraction techniques.

Any conventional alkaline reagent that does not interfere with the subsequent extraction step or the rest of the process can be used to neutralize the acidic strip solution. Typically, there can be mentioned sodium hydroxide, sodium carbonate, sodium bicarbonate and the corresponding compounds of the other alkali metals, e.g., lithium and potassium, and the oxides, hydroxides and carbonates of calcium and magnesium. The concentration of the alkaline reagent is not critical and only that amount of any particular concentration is used to make the strip solution alkaline, i.e., raise the pH of the solution to about 7. With respect to sodium hydroxide or sodium carbonate, a 2 to 4 molar solution is useful and adequate to provide from a 0.5 to 4.0 molar concentration of alkaline reagent in the strip solution. As mentioned heretofore, the less liquid used to accomplish the various neutralizations required by the process, the less total volume of liquid that is required to flow through the process.

The organic solvent or extractant used to extract technetium from the strip solution must have a high affinity or selectivity for technetium and show a favorably high distribution coefficient (organic/aqueous) for technetium relative to the alkaline aqueous medium from which the technetium is extracted. Pyridine and methyl- and ethyl-substituted pyridine derivatives, such as the 2,3-, 2,4-, 2,5-, 2,6-, 3,4- and 3,5- dimethyl pyridines have been shown to be useful for the extraction of technetium from aqueous solutions thereof. Methyl ethyl substituted pyridines and mixtures of pyridine derivatives can also be used. 2,4-dimethyl pyridine is preferred. The extraction of technetium with pyridine and methyl-substituted derivatives thereof is described adequately in *Analytical Chemistry*, Volume 33, pages 751–754, (1961). That description is therefore, incorporated herein, in toto, by reference.

Extraction of technetium from an aqueous medium containing ruthenium and other fission product metals with an organic solvent such as 2,4-dimethyl pyridine is accomplished by conventional extraction techniques and is not critical. Generally, the organic solvent is mixed with the alkaline aqueous medium containing the technetium in amounts sufficient to extract the available extractable technetium and for a length of time sufficient to obtain the amount of intimate contact between the aqueous and organic phases required to accomplish the extraction. Commonly, volumetric ratios of solvent to aqueous medium of from 10:1 to 1:10, e.g., 1:1 to 1:3 can be used. Contact times will vary, but will range from about 1 to about 60, e.g., 5–30 minutes.

Technetium is extracted into the organic solvent phase during the extraction while ruthenium remains in the aqueous phase. The two phases are allowed to separate and the aqueous phase returned to the fuel processor. The organic solvent phase can be washed further with an alkaline reagent, e.g., sodium or potassium hydroxide, to further purify the organic phase of impurities carried along with the solvent during the extraction step. The concentration and amount of alkaline reagent are not critical. Commonly 2 to 6 molar solutions in volumes ranging from about 10 to 200% of the organic phase volume are used.

The organic technetium-containing phase is steam distilled to recover the organic solvent and return the technetium to an aqueous phase. The steam distilled organic solvent is relatively pure and can be recycled for use again in the extraction step. Some of the organic solvent remains associated with the technetium in the aqueous phase since the separation is not sharp and, if desired, this organic residue can be removed by extraction with an organic solvent, such as chloroform, benzene, hexane or kerosene.

In the embodiment shown in the drawing, technetium is isolated as its salt ammonium pertechnetate, by adding an ammoniacal reagent, such as ammonia or ammonium hydroxide, to the aqueous phase resulting from the steam distillation step. This salt, ammonium pertechnetate, is crystallized from the alkaline solution. Crystallization of ammonium pertechnetate is advantageously performed at temperatures of from −5°C. to 25°C., preferably from about −5°C. to about 5°C. The crystallization can be repeated several times to improve the purity of the ammonium pertechnetate, which is an article of commerce. Ammonium pertechnetate of greater than 99 percent purity can be recovered in this manner. The mother liquor from the crystallization step can be returned to the fuel processor.

In another embodiment not shown in the drawing, the aqueous technetium containing phase can be acidified with, for example, perchloric acid or sulfuric acid, and deposited on the cathode of an electrolytic cell under controlled cathodic potential conditions in the manner discussed hereinbefore. In this embodiment, technetium metal, which is mechanically stripped from the cathode, instead of the salt, ammonium pertechnetate, is recovered as the final product.

Referring again to the drawing, the precipitate obtained as a consequence of the treatment of the acidic waste stream with alkaline earth flocculating reagent and the subsequent filtration step, is removed to an interim storage vessel from whence it can be returned to the fuel processor or subjected to further treatment. The precipitate is highly radioactive because of the presence therein of substantial quantities of ruthenium[106], strontium[90], zirconium[95], antimony[125], niobium[95], praeseodymium[144], promethium[147], yttrium[90] and cobalt[60]. Although the aforementioned precipitate is highly radioactive, it contains valuable quantities of fission product metals, such as rhodium and palladium. If the precipitate is returned to the fuel processor for concentration and disposal, such values will be lost.

The electrolytic cell into which the acidified filtrate is introduced (designated electrolytic cell 1 in the drawing) can be any conventional electrolytic cell containing fixed anodes and cathodes as distinguished from electrolytic cells employing a flowing, e.g., mercury, cathode or anode. Naturally, exposed portions of the cell housing and accessory apparatus are constructed out of materials that are resistant or inert to the acidic electrolyte as well as gases, if any, that are discharged at the anode and cathode. Examples of materials of construction for the cell housing include: polyvinyl chloride, polyvinylidene chloride, glass, polytetrafluoroethylene, polyvinylidene fluoride and titanium. Typically, the cell housing contains stand pipes on the anode and cathode sides of the cell to remove any oxygen and hydrogen formed thereat respectively. Such gases are passed usually through absolute filters before vented to the atmosphere. Naturally, the cell housing is equipped with feed inlet and discharge ports. Preferably, the discharge port is located opposite the inlet port. While the electrolysis is preferably conducted at ambient or room temperatures, the cell can be equipped with a thermoregulator and heater to regulate the temperature of the electrolyte.

While only one cell is depicted in the drawing for the aforementioned electrolysis, more than one can be used. The number of cells used is not critical. Thus, one cell, or a plurality of cells in series or disposed in a single unitary housing or box operating at a single potential can be used to remove technetium from the acidified filtrate.

The size, configuration and number of cathodes in the electrolytic cell are a function of their design and are not critical to the present invention. The cathodes should be designed in a manner such that sufficient cathode surface area is provided in the cell to plate out substantially all of the technetium desired from the solution electrolyzed.

The surface area of the cathode in the electrolytic cell will depend upon the volume of electrolyte processed and on the percentage of technetium recovery desired in a given period of time. Thus, for a given period of electrolysis, e.g., 24 hours, a cetain percentage of technetium in the electrolyte will be deposited upon a cathode of a given surface area. Generally, it is desirable that the thickness of the metal deposit on the cathode be relatively thin in order to permit removal of the metal relatively easily and to avoid dendritic growth. Typically, sufficient cathode surface area should be provided to accommodate a metal deposit of from 0.1 to 5 mils thick at 90 percent, preferably at least 95 percent, recovery and more desirably at least 99 percent recovery. The surface area of the anode should match or exceed that of the cathode in order to achieve uniform deposition of the metal on the cathode.

Thus, in operating the electrolytic cell described herein at a selected cathode potential, a cathode surface area sufficient to allow deposition of at least 90 percent, preferably at least 95 percent, and more desirably at least 99 percent, of the technetium in the electrolyte subjected to electrolysis in a given period of time is used. Generally, the current density will range from about 0.1 to about 100 amperes per square foot of cathode surface. Since the electrolysis is performed at a constant cathode potential, the voltage of the cell will be an independent variable and the current will be a dependent variable in the current-voltage relationship. The resistance of the cell is fixed initially by the cell design and electrolyte and increases with time during electrolysis. As a consequence, the current decreases with time. Such decrease is an indication of the depletion of the metal concentration in the electrolyte.

The operating variables of the electrolytic cell which affect deposition time, i.e., the rate of deposition, are the stirring or circulation of the electrolyte and the ratio of cathode surface area to electrolyte volume. A more rapid deposition rate is obtained by vigorous circulation with a given ratio of cathode surface area to electrolyte volume than with no circulation. The cathode surface area required is not a function of the concentration of the recoverable technetium in the electrolyte but is a function of the electrolyte volume. The particular cell volume required depends, in the main, on the quantity of electrolyte to be processed. Calculations, based on laboratory experience, indicate that each gallon of electrolyte requires about 0.5 square feet of cathode surface area if a technetium depletion of 99 percent in 20 hours is acceptable. To obtain a 99.9 percent depletion in 20 hours, a minimum cathode area of about 0.75 square feet per gallon of electrolyte will be necessary. Naturally, the longer the depletion time which is acceptable, the less cathode surface area required. In another sense, the lower the desired percentage depletion for a given period of time, the less cathode surface area required.

In order to achieve good stirring or circulation of the electrolyte in the cell, the cell is typically operated in conjunction with an adjoining circulation tank between which the elctrolyte is cycled. However, such cycling of electrolyte is not necessary, i.e., the volume of the cell can be sufficient to electrolyze batchwise the amount of electrolyte generated by the present recovery process in a given period of time.

The anode of the electrolytic cell can be fabricated from any conventional electrode material resistant to attack by the electrolyte present in the cell and substantially inert to gaseous oxygen which may be evolved at the anode. Suitable anode materials include noble metals, such as platinum, rhodium, iridium and platinum-iridium alloys, carbon (graphite); and valve metals, such as titanium, tantalum, zirconium, hafnium and titanium-clad copper having a coating of rhodium, platinum, iridium, platinum-iridium alloys or ruthenium oxide. By "valve metal" is meant a material which does not pass current when anodic but which does pass current when cathodic. Thus, any conventional electrode material which is compatible with the electrolyte in the electrolytic cell and which resists being solubilized during electrolysis can be used as the anode in the cell.

The cathode of the cell can be fabricated from any conventional electrode material that is resistant to attack by the elctrolyte in the cell, substantially inert to gaseous hydrogen which may be evolved at the cathode and which has a high hydrogen overvoltage. By "overvoltage" is meant the excess voltage above the theoretical voltage that is required to reduce the element, e.g., hydrogen, to its elemental state in the same electrolyte under the conditions stated. Suitable cathode materials include titanium, tantalum, zirconium, hafnium, titanium-clad copper or other valve metals and carbon (graphite). Titanium is especially useful as the cathode material.

Electrolysis of the acidified filtrate in electrolytic cell 1 is conducted by connecting the cathode(s) and anode(s) of the electrolytic cell(s) to a source of direct current and applying an electrolyzing current across the electrodes at a substantially constant cathode potential. The electric power fed to the cell is in amounts sufficient to cause electrolysis of the electrolyte and cause deposition of technetium on the cathode surface.

In accordance with the present process, technetium can be deposited effectively, i.e., at a significant rate, at a cathode potential of from about −0.3 volts to about −0.5 volts, preferably at a potential at −0.4 volts, with reference to a standard silver/silver chloride reference electrode.

Controlled cathodic potential is achieved by utilizing a standard reference electrode in a salt bridge system. In such a system, the reference electrode is electrically connected to a potentiometer-controller, which operates to provide a signal to a rectifier controlling the power to the electrolytic cell. The reference electrode is also connected electrically to a sensing tip which is positioned close to the surface of the cell cathode. The reference electrode is usually positioned in a manner such that the sensing tip is from about 0.5 to about two millimeters from the working cathode surface. In this manner, a changing cathode potential occurring on the cathode surface is sensed by the tip of the reference electrode. That change produces a signal which is transmitted from the reference electrode to the controller-potentiometer which, in turn, signals the rectifier feeding power to the electrolytic cell, thereby causing an appropriate voltage adjustment, i.e., either an increase or a decrease. This control system can regulate the cathode potential to within ±0.01 volt. Because of the generally high conductivity of the electrolyte, the use of low current densities, ambient temperatures and the reporting of potentials to 0.01 volt, correction for the voltage drop between the reference electrode tip and the working electrode surface is not generally necessary. The above-described equipment for controlling cathode potential is aptly described in U.S. Pat. No. 3,562,123. Such description is incorporated herein by reference.

While the aforementioned cathode potential is based upon a standard silver/silver chloride reference electrode, other reference electrodes, such as a standard hydrogen electrode, can be used. If another standard reference electrode is used, the numerically designated cathode potential recited hereinabove would, of course, be different.

The above discussion of electrolytic cell 1, its construction, operation, materials of construction, etc. is also applicable to other electrolytic cells referred to herein, e.g., electrolytic cell 2. There is, therefore, no need to repeat such discussion when referring to other cells because of their substantial similarity.

In a further embodiment of the present process, the precipitate is further treated to recover palladium and rhodium values, and such metal values stored until their radioactivity diminishes to a level at which they can be more easily handled. It is expected that storage of from 2 to 5 years will be required.

In accordance with one feature of the aforementioned embodiment, the precipitate is reacidified with acid of sufficient strength to dissolve the palladium and rhodium values contained in the precipitate. Typically, nitric or sulfuric acid or at least 1 molar and preferably of from 8 to 15 molar (to keep liquid volumes at a minimum) is used. Nitric acid is preferred.

The redissolved precipitate can have an acid concentration suitable for plating rhodium and palladium, e.g., less than about 4 molar and typically from 0.25 to 4 molar. Preferably, the acid concentration of the solution will be from about 0.25 to 1 molar since an excess acid concentration is unnecessary. As in the electrolysis of technetium containing solutions, acid concentrations of less than 0.25 molar can be used.

Following acidification of the precipitate, the resulting acidic aqueous solution is introduced into an electrolytic cell (electrolytic cell 2 in the drawing) and electrolyzed therein under controlled cathodic potential conditions and at a potential sufficient to co-deposit palladium and rhodium on the cathode. The anodes, cathodes, construction and operation of electrolytic cell 2 is substantially the same as that described with respect to electrolytic cell 1.

Palladium can be deposited effectively at a cathode potential range of from +0.1 to −0.05 volts, preferably at +0.05 volts. Rhodium can be deposited effectively at a cathode potential of from −0.05 volts to −0.5 volts, preferably from −0.2 volts to −0.3 volts. The aforementioned cathode potentials are with reference to a standard silver/silver chloride reference electrode. Thus, by electrolyzing the acidic solution in electrolytic cell 2 at a cathode potential of at least −0.1 volts and preferably from −0.1 to −0.15 volts, palladium and rhodium will be co-deposited upon the surface of the cathode with a minimum amount of ruthenium. Although ruthenium starts to plate out of solution at a potential of about +0.4 volts, significant plating does not occur until the potential reaches about −0.2 to about −0.25 volts.

Rhodium is substantially insoluble in most acids including aqua regia. Thus, the rhodium separated initially by filtering the acidic waste solution can be combined with the rhodium remaining following acidification of the precipitate obtained from treatment of the waste stream with the alkaline earth flocculating reagent. The total amount of solid rhodium metal thereby obtained is washed with water and dissolved by fusion with alkali metal, e.g., potassium or sodium bisulfate. Dissolution of rhodium by alkali metal bisulfate fusion is discussed on pages 846–847 of the Kirk-Othmer *Encyclopedia of Chemical Technology*, Second Edition, Volume 15, (1968). That discussion is incorporated herein by reference. Briefly, the aforementioned technique comprises mixing the rhodium metal with, for example, potassium bisulfate and heating the mixture to above the melting point of the bisulfate to dissolve the rhodium metal. After cooling, the potassium bisulfate melt containing rhodium is mixed with water to form an aqueous solution of the melt.

The amount of alkali metal bisulfate used and the temperature to which the rhodium metal-bisulfate mixture is heated is not critical. Thus, only that amount of bisulfate required to dissolve the rhodium metal obtained is required. Generally, temperatures of from the melting point of the bisulfate, e.g., 214°C. for potassium bisulfate, to about 500°C. are sufficient to dissolve the rhodium. Similarly, only that amount of water which is sufficient to dissolve completely the alkali metal bisulfate containing rhodium, most likely as the rhodium sulfate salt, is required. Typically, the resulting bisulfate solution contains from 100 to 500 grams per liter of alkali metal bisulfate, more commonly about 250 grams per liter. The bisulfate solution is acidic and can be used as a rhodium plating bath, i.e., as an electrolyte. The bisulfate solution can then be introduced into electrolytic cell 2, along with the acidified precipitate solution and the combined solutions electrolyzed therein under controlled cathodic potential conditions to thereby deposit palladium and rhodium on the surface of the cathode.

The depleted cell liquor from electrolytic cell 2 is returned to the fuel processor while the metal deposit on the surface of the cathode can be mechanically stripped and consolidated by melting. The deposit which is then in a consolidated solid compact form can be stored until the radioactivity thereof diminishes to a-point at which the metals can be handled more easily.

The present process is more particularly described in the following examples which are intended as illustrative only since numerous modifications and variations therein will be apparent to one skilled in the art.

EXAMPLE I

A simulated fission product acidic waste solution having the following composition was prepared.

| COMPONENT | CONCENTRATION |
|---|---|
| Nitric Acid | 0.25 M |
| Ruthenium | 500 milligrams per liter |
| Palladium | 300 milligrams per liter |
| Rhodium | 100 milligrams per liter |
| Technetium | 150 milligrams per liter |
| Uranium | 17 milligrams per liter |

Hydrated lime, $Ca(OH)_2$, in an amount sufficient to provide a concentration of 10 10 grams per liter (calculated as $Ca(OH)_2$) was added to a 30 milliliter sample of the simulated waste solution and stirred for over 5 minutes. The pH of the simulated solution before the addition of the hydrated lime was 1.2. When the pH of the solution reached about 9, flocculants appeared in the solution. After stirring an additional 5 minutes, the solution was filtered through a 0.8 micron millipore filter paper to separate the precipitated solids from the clear supernatant. The pH of the filtrate was about 11.

The above procedure was repeated except that hydrated lime in amounts sufficient to produce concentrations of 13.3 and 26.7 grams per liter, calculated as $Ca(OH)_2$, were used. The pH of the final solutions were about 11 and 12, respectively.

The filtrates obtained from the aforementioned filtration steps were analyzed for technetium, rhodium, palladium and ruthenium. The results are tabulated in Table I.

TABLE I

| Run | $Ca(OH)_2$ g/l added | Metal Concentration, mg. in Filtrate | | | |
|---|---|---|---|---|---|
| | | Tc | Rh | Pd | Ru |
| Original | None | 4.86 | 3.0 | 9.0 | 12.96 |
| 1 | 10 | 4.37 | .04 | .04 | .11 |
| 2 | 13.3 | 4.32 | .03 | .03 | .19 |
| 3 | 26.7 | 4.44 | .12 | 1.12 | .56 |

The data of Table I show that 89 to 91 percent of the technetium in the test solution remains in solution following the addition of calcium hydroxide thereto. The data further show that contamination of the solution with rhodium, palladium and ruthenium is minimized when the amount of calcium hydroxide added is at the 10 to 13 g/l level.

EXAMPLE II

One hundred ml of a simulated fission product acidic waste solution having the composition described in Example I are treated with 1.0 gram of calcium hydroxide and filtered through a 0.8 millipore filter. The residue on the filter is washed with deionized water (10 ml). The filtrate is analyzed and found to contain 14.6 mg. technetium, 0.13 mg. rhodium, 0.13 mg. palladium and 0.33 mg. ruthenium in 110 ml volume. The filtrate is acidified with 16 M nitric acid so the resulting acidified solution is approximately 0.2 M in $HNO_3$. The solution is then transferred to a beaker cell equipped with a platinium coated titanium anode and a titanium cathode and electrolyzed at a controlled cathode potential of —0.40 volts vs. a standard silver/silver chloride reference electrode. The electrolyte in the cell is stirred with a magnetic stirrer and the electrolysis is conducted for 6 hours with an average current of 0.35 amperes. 99.8 percent of the technetium and 60 percent of the ruthenium is deposited on the cathode. Deposition of rhodium and palladium is >99.9 percent. The electrolyte is drained from the cell and the cathode is washed with 10 ml of deionized water. The cathode deposit is anodically stripped into 30 ml of 5.3 M nitric acid. The acid solution containing the technetium is made basic with sodium hydroxide and diluted to 50 ml. The basic solution is extracted with two 50 ml portions of 2,4-dimethylpyridine in a separatory funnel and 96 percent of the Tc is recovered in the organic phase. Steam distillation of the organic phase is conducted in a 250 ml three-necked flask equipped with a Friedrick condenser. The organic phase distills over at 97°C leaving an aqueous phase containing technetium free of palladium, rhodium and ruthenium. The aqueous phase is mixed with a stoichiometric excess of ammonium hydroxide and the salt, ammonium pertechnetate, is crystallized therefrom at 0°C. The salt is recovered, washed with deionized water and dried.

I claim:

1. A process for separating technetium values from aqueous acidic solution containing said metal values and other fission product metal values, which comprises mixing with said acidic solution alkaline flocculating reagent selected from alkaline earth metal oxides and hydroxides in amounts sufficient to raise the pH of the solution to between about 9 and about 12 and thereby form a precipitate containing fission product metal values and a supernatant phase containing technetium values, separating the supernatant from the precipitate, acidifying the supernatant with mineral acid to an acid concentration of not more than about 1 molar, electrolyzing acidified supernatant in an electrolytic cell under controlled cathodic potential conditions and at a potential sufficient to deposit technetium on the cathode, removing technetium depleted supernatant from the electrolytic cell and removing elemental technetium deposits from the cathode.

2. The process of claim 1 wherein the acidic waste solution is a Purex acid waste stream.

3. The process of claim 1 wherein the waste solution is filtered before being mixed with the alkaline flocculating reagent to remove undissolved rhodium therefrom.

4. The process of claim 1 wherein the alkaline flocculating reagent is an oxide or hydroxide of magnesium or calcium.

5. The process of claim 1 wherein the pH of the waste solution is raised to from about 9 to about 11 with the alkaline flocculating reagent.

6. The process of claim 1 wherein the supernatant phase is acidified with nitric or sulfuric acid.

7. The process of claim 1 wherein the acidified supernatant has an acid concentration of from 0.25 molar to about 1 molar.

8. The process of claim 1 wherein the acidified supernatant is electrolyzed at a controlled cathode potential of from about −0.3 to about −0.5 volts with reference to a standard silver/silver chloride reference electrode.

9. The process of claim 1 wherein technetium metal deposited on the cathode is dissolved in strong mineral acid to form an acid solution of technetium values, the acid solution is made alkaline with alkaline reagnet, technetium values are extracted from the alkaline solution with an organic solvent having affinity for technetium and technetium values are separated from the organic solvent.

10. The process of claim 9 wherein the organic solvent is pyridine or dimethyl substituted pyridine derivatives.

11. The process of claim 9 wherein the organic solvent containing extracted technetium is steam distilled to provide an aqueous solution containing technetium values and ammoniacal reagnet is added to the aqueous solution in amounts sufficient to form ammonium pertechnetate.

12. The process of claim 1 wherein the precipitate is dissolved in mineral acid to form an acidic solution of fission product metal values having an acid concentration of less than 4 molar and the acidic solution electrolyzed in an electrolytic cell under controlled cathodic potential conditions and at a potential at which palladium and rhodium are deposited on the cathode.

13. The process of claim 12 wherein the acidic solution is electrolyzed at a controlled cathode potential of at least −0.1 volts with reference to a standard silver/silver chloride reference electrode.

14. The process of claim 13 wherein the controlled cathode potential is from about −0.1 to about −0.15 volts.

15. A process for separating technetium values from aqueous acidic solution containing said metal values and other fission product metal values, said aqueous acidic solution being obtained from the processing of nuclear fuel elements, which comprises mixing with said acidic solution alkaline flocculating agent selected from the oxides and hydroxides of calcium and magnesium to raise the pH of the solution to between 9 and 11 and thereby form a precipitate containing fission product metal values and a supernatant phase containing technetium values, separating the supernatant from the precipitate, acidifying the supernatant with mineral acid to an acid concentration of less than about 1 molar, electrolyzing the acidified supernatant in an electrolytic cell under controlled cathodic potential conditions and at a potential sufficient to deposit technetium on the cathode, removing technetium depleted supernatant from the electrolytic cell and removing elemental technetium deposits from the cathode.

16. The process of claim 15 wherein the precipitate is dissolved in mineral acid to form an acidic solution of fission product metal values having an acid concentration of less than 4 molar and the acidic solution electrolyzed in an electrolytic cell under controlled cathodic potential conditions and at a potential at which palladium and rhodium are deposited on the cathode.

* * * * *